US012285861B2

(12) United States Patent
Cardenas et al.

(10) Patent No.: US 12,285,861 B2
(45) Date of Patent: Apr. 29, 2025

(54) UTILIZING SOFT ACTUATED INFLATABLE ROBOTICS

(71) Applicant: Boston Engineering Corporation, Waltham, MA (US)

(72) Inventors: Robert Lee Cardenas, Framingham, MA (US); Michael Conry, Beverly, MA (US); Todd Scrimgeour, Brighton, MA (US); Willard Ober, Atlanta, GA (US); Michael Rufo, Hanover, MA (US)

(73) Assignee: Boston Engineering Corporation, Waltham, MA (US)

( * ) Notice: Subject to any disclaimer, the term of this patent is extended or adjusted under 35 U.S.C. 154(b) by 1015 days.

(21) Appl. No.: 17/237,212

(22) Filed: Apr. 22, 2021

(65) Prior Publication Data

US 2022/0072700 A1 Mar. 10, 2022

Related U.S. Application Data

(60) Provisional application No. 63/014,855, filed on Apr. 24, 2020.

(51) Int. Cl.
*B25J 9/14* (2006.01)
*B25J 15/10* (2006.01)
*B25J 15/12* (2006.01)

(52) U.S. Cl.
CPC .............. *B25J 9/142* (2013.01); *B25J 15/10* (2013.01); *B25J 15/12* (2013.01)

(58) Field of Classification Search
CPC ............. B25J 9/142; B25J 15/10; B25J 15/12
See application file for complete search history.

(56) References Cited

U.S. PATENT DOCUMENTS

| 5,181,452 | A | * | 1/1993 | Immega | B25J 18/06 |
| | | | | | 92/92 |
| 8,382,177 | B2 | | 2/2013 | Rizk et al. | |
| 8,640,386 | B1 | | 2/2014 | Griffith et al. | |
| 8,919,714 | B2 | | 12/2014 | Rizk et al. | |

(Continued)

OTHER PUBLICATIONS

"Revolutionary Automated Picking Solutions," SoftRobotics, https://www.softroboticsinc.com/, pp. 1-5.

(Continued)

*Primary Examiner* — Stephen A Vu
(74) *Attorney, Agent, or Firm* — BainwoodHuang

(57) ABSTRACT

A robotic system which includes a fluid controller, an arm portion, and a soft end effector apparatus coupled with the fluid controller and the arm portion. The soft end effector apparatus includes a base constructed and arranged to mount to the arm portion, a set of wrist assemblies coupled with the base, and a set of finger assemblies coupled with the set of wrist assemblies. Each wrist assembly of the set of wrist assemblies (i) couples with a respective finger assembly and (ii) provides movement to that respective finger assembly relative to the base during actuation of that wrist assembly and during independent actuation of that respective finger assembly in response to control from the fluid controller. Along these lines, the fluid controller may individually provide pressurized fluid to each wrist assembly and each finger assembly when controlling interaction between the soft end effector apparatus and an external object.

19 Claims, 13 Drawing Sheets

(56) References Cited

U.S. PATENT DOCUMENTS

| | | |
|---|---|---|
| 8,991,884 B2 * | 3/2015 | DeLouis .............. B25J 15/0009 |
| | | 294/111 |
| 8,992,113 B2 | 3/2015 | Campagna et al. |
| 9,144,909 B2 | 9/2015 | Delouis et al. |
| 9,464,642 B2 | 10/2016 | Ilievski et al. |
| 9,624,911 B1 * | 4/2017 | Griffith ................... F24S 23/74 |
| 9,821,475 B1 | 11/2017 | Lynn et al. |
| 10,076,844 B2 | 9/2018 | Rizk |
| 10,093,023 B2 | 10/2018 | Lessing et al. |
| 10,272,575 B2 | 4/2019 | Pedersen et al. |
| 10,465,723 B2 | 11/2019 | Ilievski et al. |
| 10,478,974 B2 * | 11/2019 | Curhan .................. B25J 15/026 |
| 10,562,180 B2 | 2/2020 | Telleria et al. |
| 10,605,365 B1 | 3/2020 | Griffith et al. |
| 10,619,633 B2 | 4/2020 | Lynn et al. |
| 10,690,288 B2 | 6/2020 | Griffith et al. |
| 10,702,992 B2 | 7/2020 | Lessing et al. |
| 10,704,665 B2 | 7/2020 | Rizk et al. |
| 10,792,807 B2 | 10/2020 | Lessing et al. |
| 10,875,197 B2 | 12/2020 | Lynn et al. |
| 11,027,436 B2 | 6/2021 | Beri |
| 11,090,818 B2 | 8/2021 | Curhan et al. |
| 11,378,169 B2 | 7/2022 | Rizk et al. |
| 2012/0210818 A1 * | 8/2012 | Fischer .................... B25J 9/142 |
| | | 901/21 |
| 2017/0056526 A1 * | 3/2017 | Dohmen .............. A61K 9/0053 |
| 2017/0282360 A1 * | 10/2017 | Telleria ...................... F16J 3/04 |

OTHER PUBLICATIONS

Griffith; "Electrify an Optimist's Playbook for Our Clean Energy Future," Otherlab, https://www.otherlab.com/, pp. 1-24.

* cited by examiner

UTILIZING SOFT ACTUATED INFLATABLE ROBOTICS

GOVERNMENT LICENSE RIGHTS

This invention was made with government support under N00014-15-P-1129 awarded by the Office of Naval Research. Additionally, this invention was made with government support under 17-355-0009-0046-UDMI-BE, which is a subcontract under prime contract N68335-17-C-0046, awarded by the Office of Naval Research. The government has certain rights in the invention.

CROSS REFERENCE TO RELATED APPLICATIONS

This application is a regular utility of earlier-filed U.S. Application No. 63/014,855, filed on Apr. 24, 2020 and entitled "SOFT ACTUATED INFLATABLE ROBOTICS", the contents and teachings of which are hereby incorporated by reference in their entirety.

BACKGROUND

Some conventional robotic grippers are largely metallic for high grip strength. Along these lines, such a gripper may include metallic gears, metallic actuators, metallic claw members, etc. to accomplish a particular task such as an assembly line operation (e.g., manufacturing automation).

SUMMARY

Unfortunately, there are deficiencies to a conventional robotic gripper which is largely metallic or comprised of traditionally hard/solid elements in order to provide high grip strength. For example, while such a gripper may be suitable for a particular assembly line operation where everything is controlled and known, such a gripper offers little compliance thus limiting what objects the gripper can pick up. That is, due to the rigid, inflexible nature of the metallic (or otherwise non-soft) components, often the gripper can only pick up objects the gripper was designed to pick up or that meet a limited set of specifications, otherwise limiting the versatility of the gripper.

Additionally, in certain situations such as explosive ordnance disposal (EOD) applications, the magnetic signature of the conventional robotic gripper which is largely metallic is very problematic. Furthermore, in contrast to the weight and power requirements associated with the conventional robotic gripper, the expeditionary nature of EOD tasks often requires a very small footprint for size, weight and power thus making the conventional robotic gripper poorly suited for such EOD applications.

To lower the magnetic signature, size, and weight of a gripper, one may attempt to incorporate conventional soft robotics. However, conventional soft robotics is typically characterized by low gripping limits. For example, some conventional soft robotics simply use limited internal pressure to deform fingers to grab light weight objects. Likewise, various conventional soft robotics research papers focus on low pressure, non-reinforced fingers. Moreover, suppose that such fingers are reinforced using fabric, such use of fabric does not improve grip strength and if anything limits dexterity.

In contrast to conventional robotic grippers, improved techniques are directed to utilizing a soft end effector apparatus having different sets of actuators, e.g., a set of wrist actuators and a set of finger actuators. Both sets of actuators may have soft actuator designs which enable improvement in compliance/versatility and reduction in size, weight, magnetic signature, etc. Moreover, the configuration of such actuators may provide an effective combination of strength (e.g., a "rigid air beam" in each finger actuator) and maneuverability/conformity (e.g., enabling the set of finger actuators to interact with different objects or object orientations when applying effective gripping force).

One embodiment is directed to a soft end effector apparatus that includes a base, a set of wrist assemblies coupled with the base, and a set of finger assemblies coupled with the set of wrist assemblies. Each wrist assembly of the set of wrist assemblies (i) couples with a respective finger assembly of the set of finger assemblies and (ii) provides movement to that respective finger assembly relative to the base during actuation of that wrist assembly and during independent actuation of that respective finger assembly.

Another embodiment is directed to a method of operating a soft end effector apparatus. The method includes:
(A) moving a base of the soft end effector apparatus into proximity of an object, the base supporting a set of wrist assemblies of the soft end effector apparatus;
(B) orienting a set of finger assemblies of the soft end effector apparatus relative to the object, the set of finger assemblies coupling with the set of wrist assemblies; and
(C) controlling delivery of pressurized fluid to the set of finger assemblies and the set of wrist assemblies to control interaction between the soft end effector apparatus and the object.

Yet another embodiment is directed to a robotic system which includes a fluid controller, an arm portion, and a soft end effector apparatus coupled with the fluid controller and the arm portion. The soft end effector apparatus includes:
(A) a base constructed and arranged to mount to the arm portion,
(B) a set of wrist assemblies coupled with the base, and
(C) a set of finger assemblies coupled with the set of wrist assemblies.

Each wrist assembly of the set of wrist assemblies (i) couples with a respective finger assembly of the set of finger assemblies and (ii) provides movement to that respective finger assembly relative to the base during actuation of that wrist assembly and during independent actuation of that respective finger assembly in response to control from the fluid controller.

Yet a further embodiment is directed to a method of combining of a set of soft members and a set of soft actuators to create compliant loading and contact while maintaining at least one of significant applied force and significant applied torque. The method includes:
(A) fixing the set of soft members to a set of predefined degrees of freedom;
(B) producing rotational and translational compliance to all interfaces with the set of soft members; and
(C) applying at least one of force and torque to the set of soft members through the set of soft actuators which is coupled to the set of soft members.

In some arrangements, each wrist assembly of the set of wrist assemblies includes a compliant member disposed between the base and the respective finger assembly coupled to that wrist assembly. The compliant member selectively inflates and deflates to impart movement to the respective finger assembly.

In some arrangements, the compliant member of each wrist assembly is in the shape of a bellows which expands to apply force on the respective finger assembly coupled to that wrist assembly. The respective finger assembly is pivotably mounted to the base to translate the applied force into pivoting movement relative to the base.

In some arrangements, the compliant member of each wrist assembly is deformed by the pressurized input fluid during actuation and is restored to its initial geometry by elastic forces when the input pressure is removed.

In some arrangements, each finger assembly of the set of finger assemblies includes a fabric sleeve and a bladder disposed within the fabric sleeve. The bladder selectively inflates and deflates to control movement of the fabric sleeve.

In some arrangements, the fabric sleeve of each finger assembly defines a smooth curved finger to provide compliance and strength while applying gripping force to an external object.

In some arrangements, the fabric sleeve of each finger assembly defines an accordion surfaced finger to provide finger profile changes during actuation of that finger assembly.

In some arrangements, the set of wrist assemblies includes exactly four wrist assemblies. Each of the exactly four wrist assemblies couple with a same side of the base and is constructed and arranged to extend in a direction away from the same side of the base during actuation.

In some arrangements, the set of finger assemblies includes exactly four finger assemblies. The exactly four finger assemblies includes (i) a first pair of finger assemblies constructed and arranged to move toward and away from each other along a first axis, and (ii) a second pair of finger assemblies constructed and arranged to move toward and away from each other along a second axis that is perpendicular to the first axis.

In some arrangements, the base is constructed and arranged to mount to a robotic arm assembly to form a robotic manipulator.

In some arrangements, the fluid controller is constructed and arranged to individually provide pressurized fluid to each wrist assembly of the set of wrist assemblies and to each finger assembly of the set of finger assemblies. Such operation enables rich and reliable control of interaction between the soft end effector apparatus and an external object.

Other embodiments are directed to systems and apparatus, assemblies and subsystems, processing circuits, computer program products, and so on. Some embodiments are directed to various methods, components and mechanisms of a variety of scales and sizes, and which are involved in utilizing soft actuated inflatable robotics.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to utilizing a soft end effector apparatus having different sets of actuators, e.g., a set of wrist actuators and a set of finger actuators. Both sets of actuators may have soft actuator designs which enable improvement in compliance/versatility and reduction in size, weight, magnetic signature, etc. Moreover, the configuration of such actuators may provide an effective combination of strength (e.g., a "rigid air beam" in each finger actuator) and maneuverability/conformity (e.g., enabling the set of finger actuators to interact with different objects or object orientations when applying effective gripping force).

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
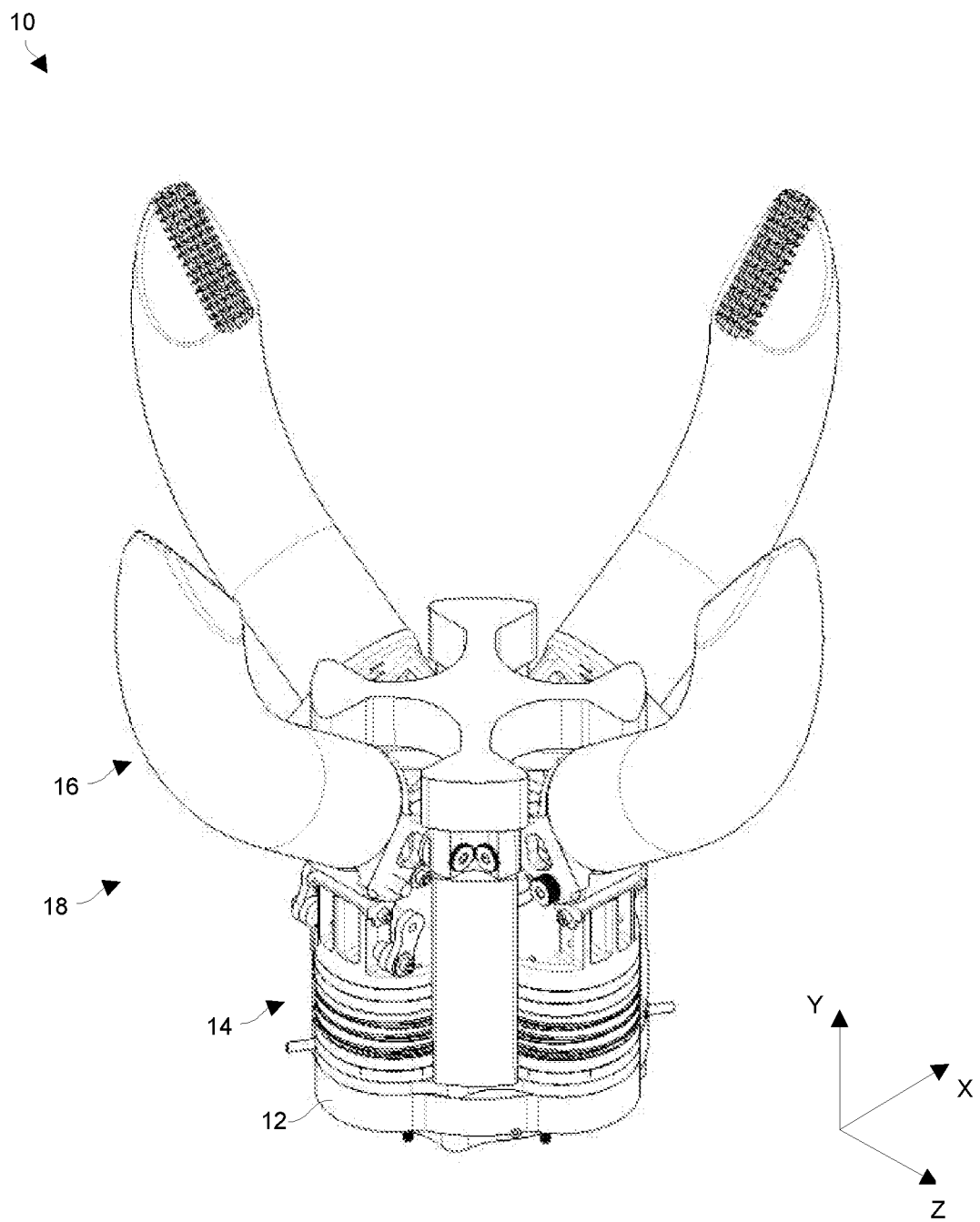
FIG. 1 is a perspective view of an example soft end effector apparatus in accordance with certain embodiments.
Figure 2:
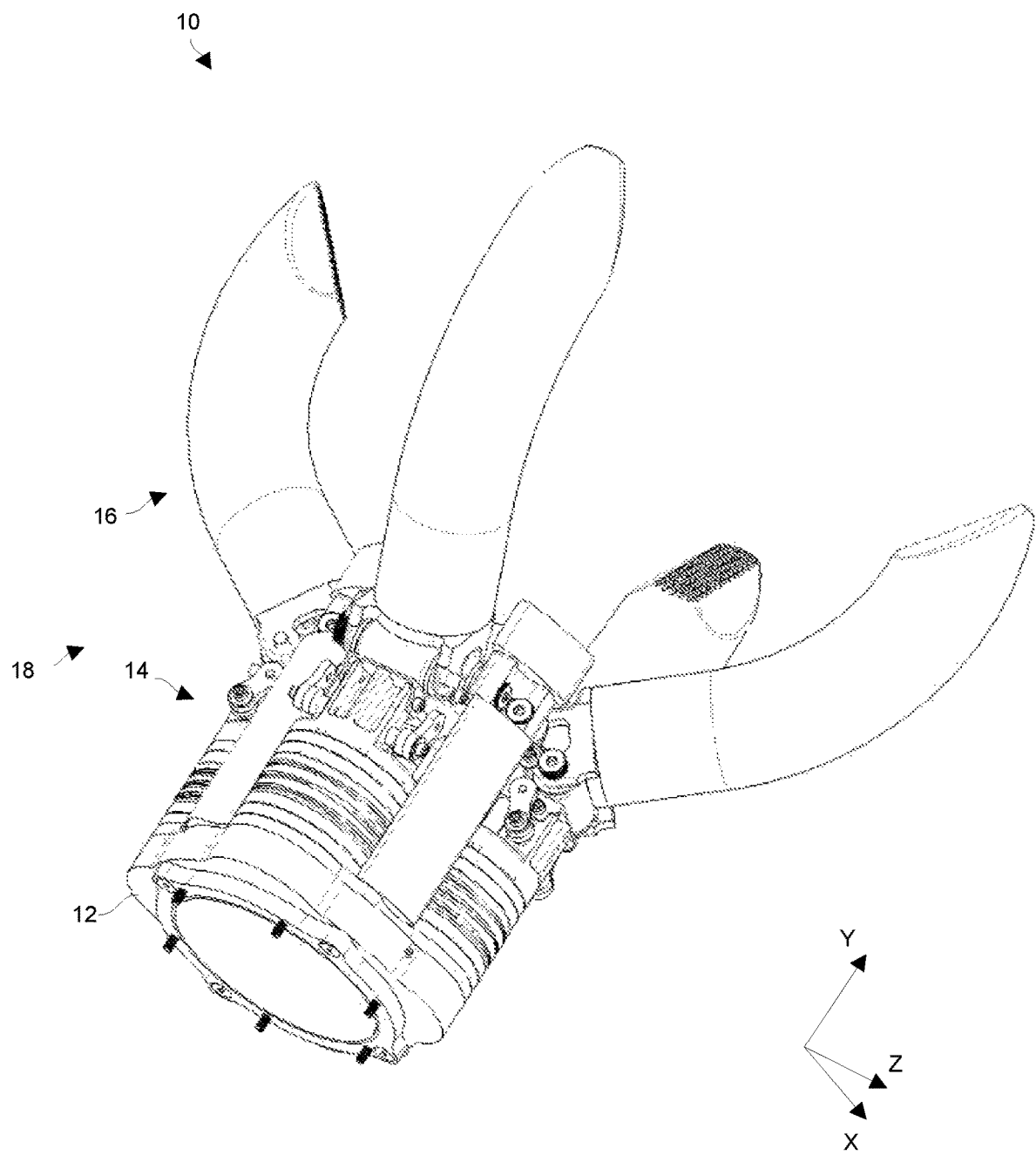
FIG. 2 is another perspective view of the example soft end effector apparatus in accordance with certain embodiments.
Figure 3:
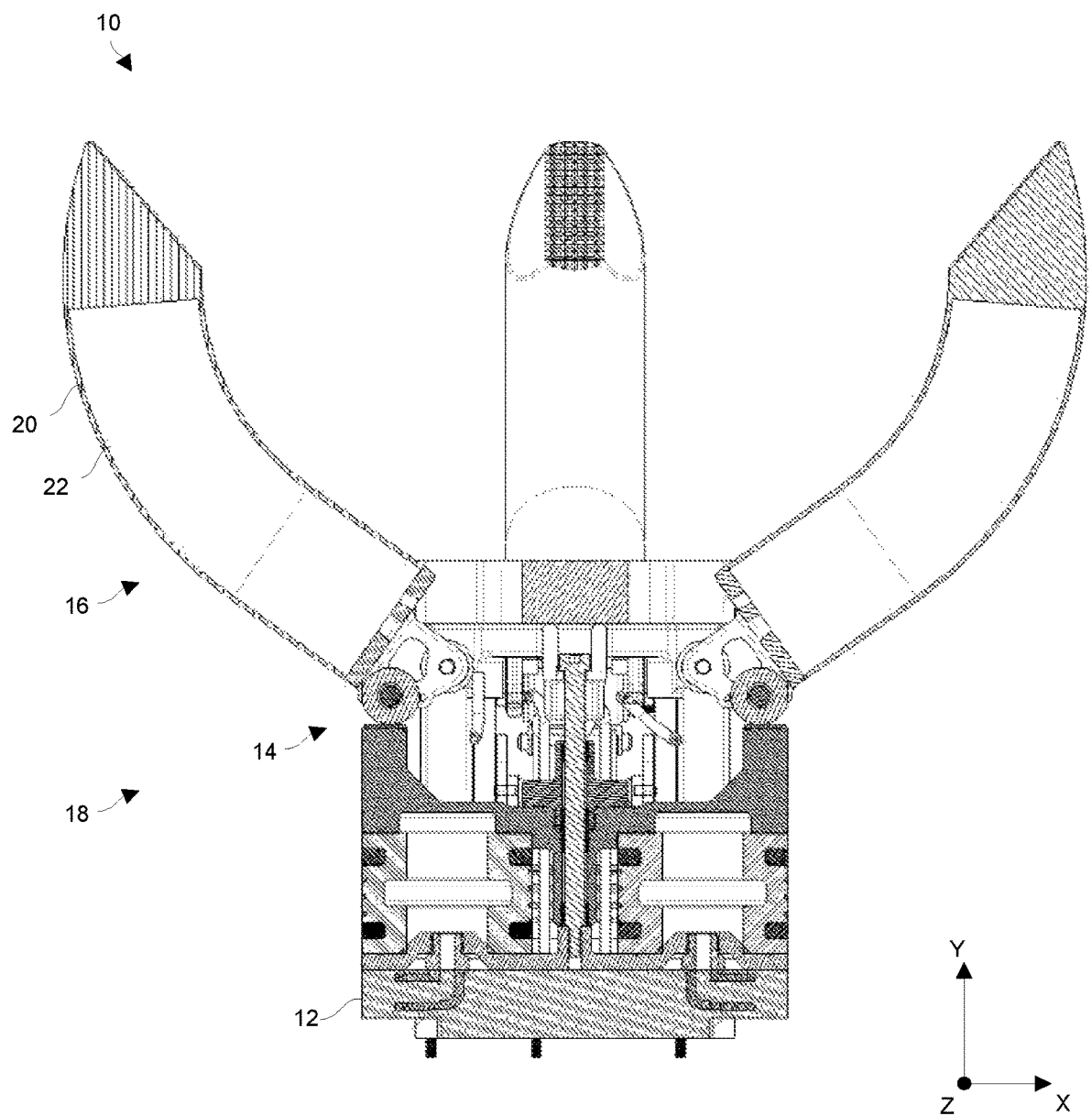
FIG. 3 is a cross-sectional side view of the example soft end effector apparatus in accordance with certain embodiments.

FIGS. 1 through 3 show an example soft end effector apparatus 10 in accordance with certain embodiments. FIG. 1 shows the example soft end effector apparatus 10 from one angle. FIG. 2 shows the example soft end effector apparatus 10 from another angle. FIG. 3 shows a cross-sectional side view of the example soft end effector apparatus 10.

The example soft end effector apparatus 10 is suitable for use in larger robotic systems and includes a base 12, a set of wrist assemblies 14 coupled with the base 12, and a set of finger assemblies 16 coupled with the set of wrist assemblies 14. Each wrist assembly 14 couples with a respective finger assembly 16 to form a soft appendage 18 having multiple portions (or sections) of actuation.

Although the soft end effector apparatus 10 is shown as including four soft appendages 18 (i.e., two pairs of opposing soft appendages 18), the soft end effector apparatus 10 may include a different number of soft appendages 18 (e.g., one, two, three, five, six, and so on). Moreover, there is no restriction or requirement that each appendage 18 be paired to an opposing soft appendage 18.

For example, multiple soft appendages 18 may be generally oriented or arranged to point/operate in the same direction such as certain fingers of a human hand. Alternatively or in combination, one or more soft appendages 18 may be oriented or arranged to face an opposing structure or structures (e.g., one or more opposing soft appendages 18). Moreover, the shapes and scales of the soft appendages 18 may differ in geometry (e.g., different lengths, different thicknesses, different shapes, different sizes and/or proportions, combinations thereof, etc.).

The base 12 is constructed and arranged to support a portion of each wrist assembly 14. In accordance with certain embodiments, the base 12 serves as an anchor or mounting surface upon which one end of each wrist assembly 14 may fasten securely (e.g., on one side of the base 12). The base 12 may also be provisioned to mount (e.g., via the other side of the base 12) to another structure such as an arm portion of a larger robotic system.

Each wrist assembly 14 is constructed and arranged to connect a respective finger assembly 14 to the base 12. Additionally, each wrist assembly 14 is capable of providing movement to that respective finger assembly 16 (e.g., actuation) independently of operation of that respective finger assembly 16. In particular, each wrist assembly 14 actuates in response to a change in fluid pressure. Along these lines and as will be explained in further detail later, an increase in fluid pressure to a wrist assembly 14 causes the wrist assembly 14 to pivot in a first angular direction, and a decrease in fluid pressure to the wrist assembly 14 causes the wrist assembly 16 to pivot in a second angular direction that is opposite the first angular direction.

Each finger assembly 16 is constructed and arranged to couple with a respective wrist assembly 14 and actuate relative to that wrist assembly 14. Furthermore, each finger assembly 16 is capable of interacting with external objects (e.g., contacting an object, applying pressure to an object, etc.). In particular, each finger assembly 16 actuates in response to a change in fluid pressure. Along these lines and as will be explained in further detail later, an increase in fluid pressure to a finger assembly 16 causes the finger assembly 16 to strengthen and expand, and a decrease in fluid pressure to the finger assembly 16 causes the finger assembly 16 to weaken, or become more compliant, and shrink.

As best seen in the cross-sectional side view of FIG. 3, each finger assembly 16 includes a fabric sleeve (or sheathing) 20 and a bladder 22 disposed within the fabric sleeve 20. The bladder 22 selectively inflates and deflates to control movement of the fabric sleeve 20. In accordance with certain embodiments, the fabric sleeve 20 shapes the finger assembly 16 into an arc thus enabling the finger assembly 16 to interact with objects at the end of the finger assembly 16 (e.g., a finger tip of the finger assembly 16) and/or along a lateral side of the finger assembly 16 (e.g., an inner surface of the finger assembly 16).

In some arrangements, the fabric sleeve 20 is radially and longitudinally inextensible. In some arrangements, the wrist assembly 14 is provisioned with a radially inextensible sleeve.

In accordance with certain embodiments, the fabric sleeve 20 of one or more of the finger assemblies 16 defines a smooth curved finger. Such a feature provides compliance and strength while applying gripping force to an external object.

In accordance with certain embodiments, the fabric sleeve 20 of one or more of the finger assemblies 16 defines an accordion surfaced finger. Such feature provides finger profile changes during actuation of that finger assembly.

In accordance with certain embodiments, each wrist assembly 14 and each finger assembly is individually/independently controllable via fluid pressure. Accordingly, each soft appendage 18 that is formed by a wrist assembly 14 and a finger assembly 16 is also individually/independently controllable in multiple degrees of freedom. Such features not only enable a single soft appendage 18 to excel in maneuverability when performing useful work (e.g., touching an object, moving an object, etc.), but also enables multiple soft appendages 18 to operate collaboratively to perform advanced maneuvers when performing useful work. That is, the soft end effector apparatus 10 as a whole is able to perform complex operations (e.g., hold an object, pick up and put down an object, squeeze an object, etc.). Further details will now be provided with reference to FIGS. 4 through 6.

Figure 4:
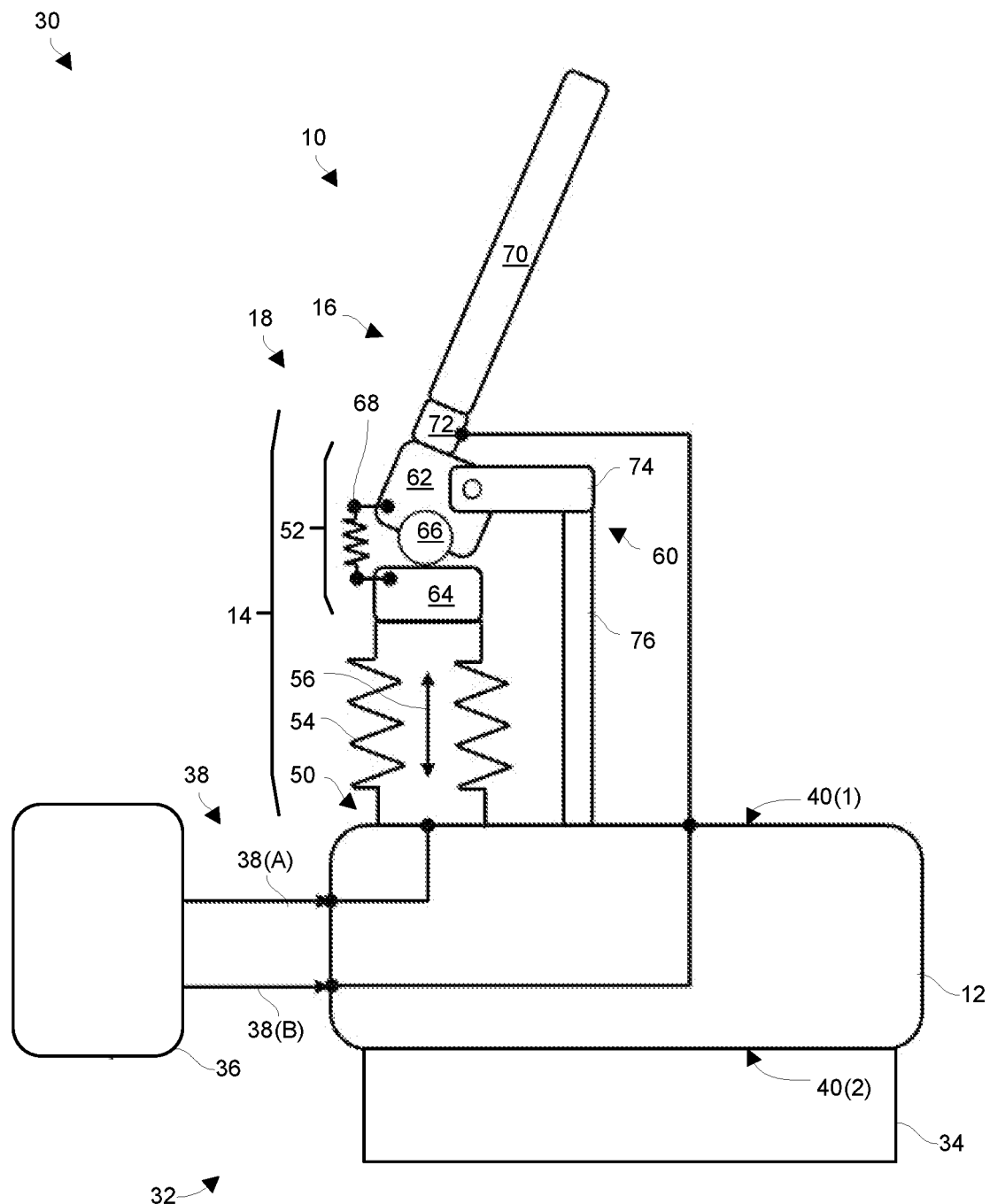
FIG. 4 is a schematic view of a robotic system that utilizes the example soft end effector apparatus in a compressed state in accordance with certain embodiments.
Figure 5:
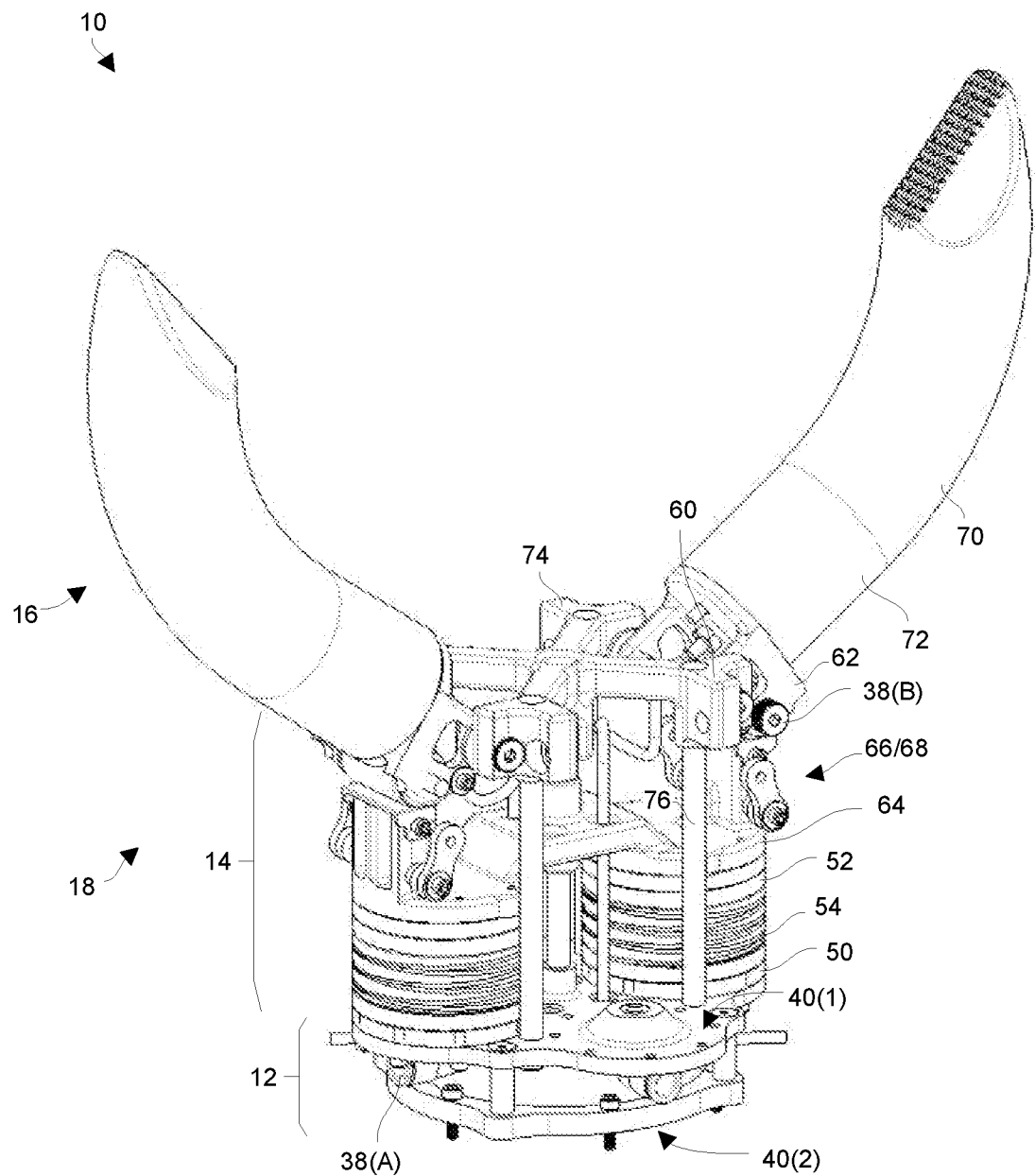
FIG. 5 is a perspective view of a portion of the example soft end effector apparatus in accordance with certain embodiments.
Figure 6:
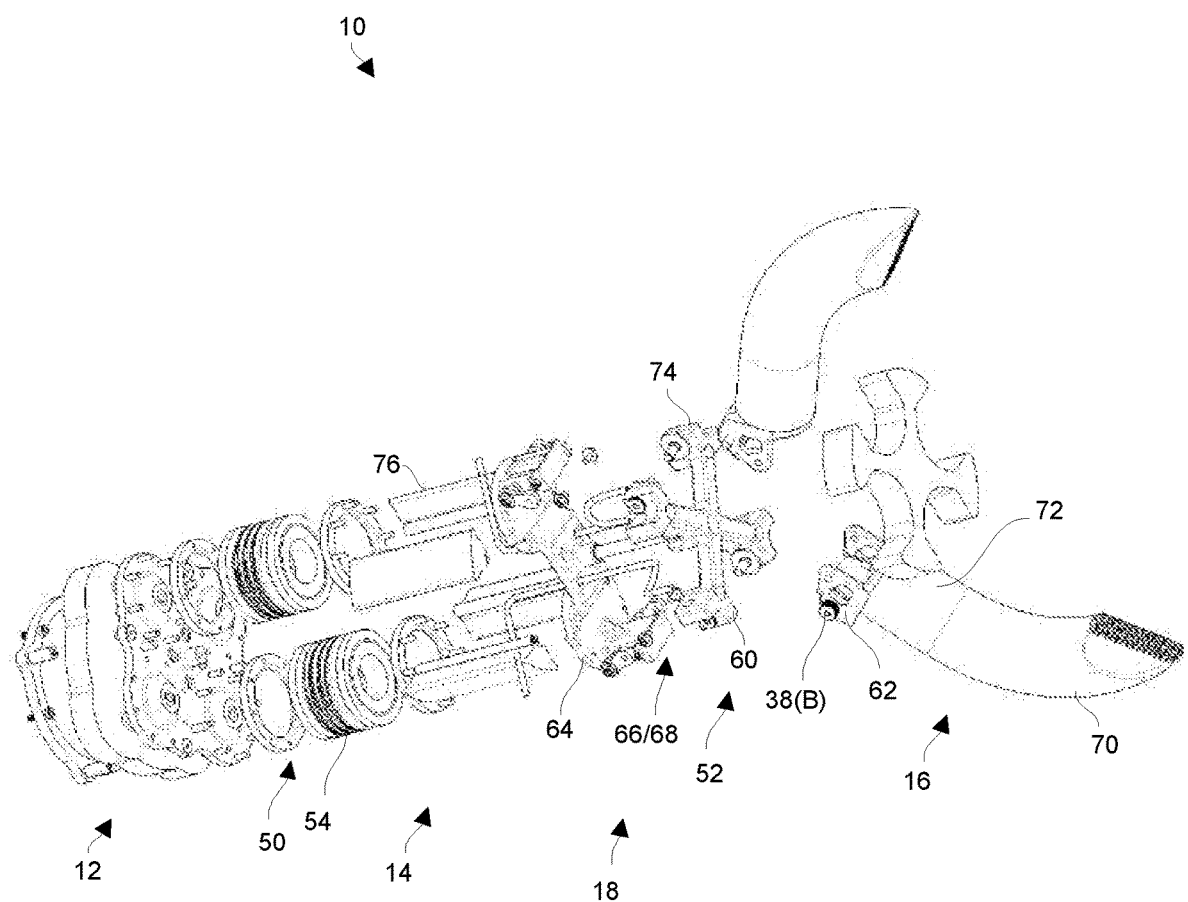
FIG. 6 is an exploded view of the portion of the example soft end effector apparatus in accordance with certain embodiments.

FIGS. 4 through 6 provide further details of the soft end effector apparatus 10 in accordance with certain embodiments. FIG. 4 schematically shows certain components of the soft end effector apparatus 10 and the relationship of the soft end effector apparatus 10 with certain components of a robotic system. FIG. 5 shows a pair of opposing soft appendages 18. FIG. 6 shows an exploded view of the pair of opposing soft appendages 18.

FIG. 4 shows a soft appendage 18 of the soft end effector apparatus 10 in the context of a larger robotic system 30. This robotic system 30 includes one or more other devices 32 such as a robotic arm 34 (represented by the block 34) onto which the base 12 of the soft end effector apparatus 10 may install or mount. In accordance with certain embodiments, the robotic system 30 further includes other devices 32 such as other robotics, sensors, specialized equipment, and so on.

In accordance with certain embodiments, the robotic system 30 further includes a fluid controller 36 (represented by the block 36) that provides fluid under pressure through separate individual fluid feeds 38(A), 38(B) (collectively, fluid feeds 38). Each fluid feed 38 carries fluid under individual pressure control.

In some arrangements, all of the feeds 38 carry a gas. In other arrangements, all of the feeds carry a liquid. In yet other arrangements, some feeds 38 carry a gas and other feeds carry a liquid.

As shown in FIG. 4, the base 12 includes a first side 40(1) that supports the soft appendage 18 and a second side 40(2) opposite the first side 40(1) that couples with one or more other device 32 of the robotic system 30. As shown in FIGS. 5 and 6, the base 12 operates as a manifold/mount. In particular, the base 12 may be provisioned with mounting holes, threads, and/or other hardware features to facilitate mounting/fastening to another structure. Additionally, the base 12 defines one or more openings 40 through which the fluid feeds 38 pass thus enabling the base 12 to protect and/or contain at least portions of the fluid feeds 38 that lead from the fluid controller 36 to the various wrist assemblies 14 and finger assemblies 16 (also see FIGS. 1 through 3).

It should be understood that, in accordance with certain embodiments, the base 12 supports additional locations for other componentry. Such other componentry may include additional fluid feeds 38 (e.g., to other soft actuator assemblies), gauges, other sensors, valves, and so on. Accordingly, the base 12 may serve as an actuator manifold connection plate with connect fittings.

Similarly, such other componentry may be positioned at other locations. For example, such componentry may be located on or adjacent to the wrist assembly 14 and/or on or adjacent to the finger assembly 16.

As shown in FIG. 4, the wrist assembly 14 of the soft appendage 18 includes a first end 50 that couples with the base 12, and a second end 52 that couples with the finger assembly 16 of the soft appendage 18. In accordance with certain embodiments, the first end 50 of the wrist assembly 14 has a wrist actuator 54 that linearly extends and compresses along an axis 56 (FIG. 4) in response to changes in fluid pressure from the fluid controller 36 through a fluid feed 38 (e.g., fluid feed 38(A)). During such operation, the wrist actuator 54 moves the end 52 relative to the base 12.

In accordance with certain embodiments, the second end 52 of the wrist assembly 14 is configured as a cam that translates linear motion from the wrist actuator 54 into rotational motion that pivots the finger assembly 16 which is coupled with the wrist assembly 14. In particular, the second end 52 includes a pivot mount 60, a rocker body 62 that pivots relative to the pivot mount 60, a push plate 64 coupled with the wrist actuator 54, and a roller 66 disposed between the rocker body 62 and the push plate 64, and a spring 68 coupled with the rocker body 62 and the push plate 64.

As the wrist actuator 54 elongates along the axis 56 (e.g., in response to an increase in fluid pressure), the push plate 64 moves the roller 66 away from the base 12 and pivots the rocker body 62 to rotate in a first direction relative to the base 12. That is, the roller 66 (e.g., a pivot roller) transmits linear force from wrist assembly actuation into finger assembly closing torque. Such operation is considered to transition the wrist assembly 14 from the compressed state to an extended state.

Additionally, as the wrist actuator 54 compresses along the axis 56 (e.g., in response to a decrease in fluid pressure), the push plate 64 moves back toward the base 12. During such compression, the spring 68 pulls the rocker body 62 to rotate in a second direction relative to the base 12 that is opposite the first direction. Accordingly, the finger assembly 16 and the rocker body 62 pivot backwards as the wrist assembly 14 returns from the extended state to the compressed state.

Furthermore, the finger assembly 16 couples with the second end 52 of the wrist assembly 14. In accordance with certain embodiments, the finger assembly 16 includes an inflatable finger 70, and interface joint 72 interconnected between the inflatable finger 70 and the rocker body 62 of the wrist assembly 14. Certain details of such a finger assembly 16 were described earlier in connection with FIG. 3. The interface joint 72 is provisioned with a fitting that couples with a fluid feed 38 from the fluid controller 36 (e.g., see the fluid feed 38(B) in FIG. 4).

As mentioned earlier, each finger assembly 16 actuates in response to a change in fluid pressure. Such a change in fluid pressure is controlled independently by the fluid controller 36 relative to other wrist assemblies 14 and finger assemblies 16.

As best seen in FIGS. 5 and 6 and in accordance with certain embodiments, the pivot 60 includes an upper portion 74 and a lower portion 76. The upper portion 74 couples with the lower portion 76.

The upper portion 74 serves as a top plate or frame/platform that provides pivot locations for attachment of multiple finger assemblies 16. For example, such a top plate rigidly attaches opposing finger assemblies 16 together to provide structure, ensure linear motion between the finger assemblies 16 during actuation, and provides a surface for the rollers 66.

The lower portion 76 serves as a middle/lower frame that provides structural support to the upper portion 74. Additionally, the lower portion 76 may be hollow and/or provide beam-shaped channels enabling one or more fluid feeds 38 to pass therethrough or there along. Further details will now be provided with reference to FIGS. 7 and 8.

Figure 7:
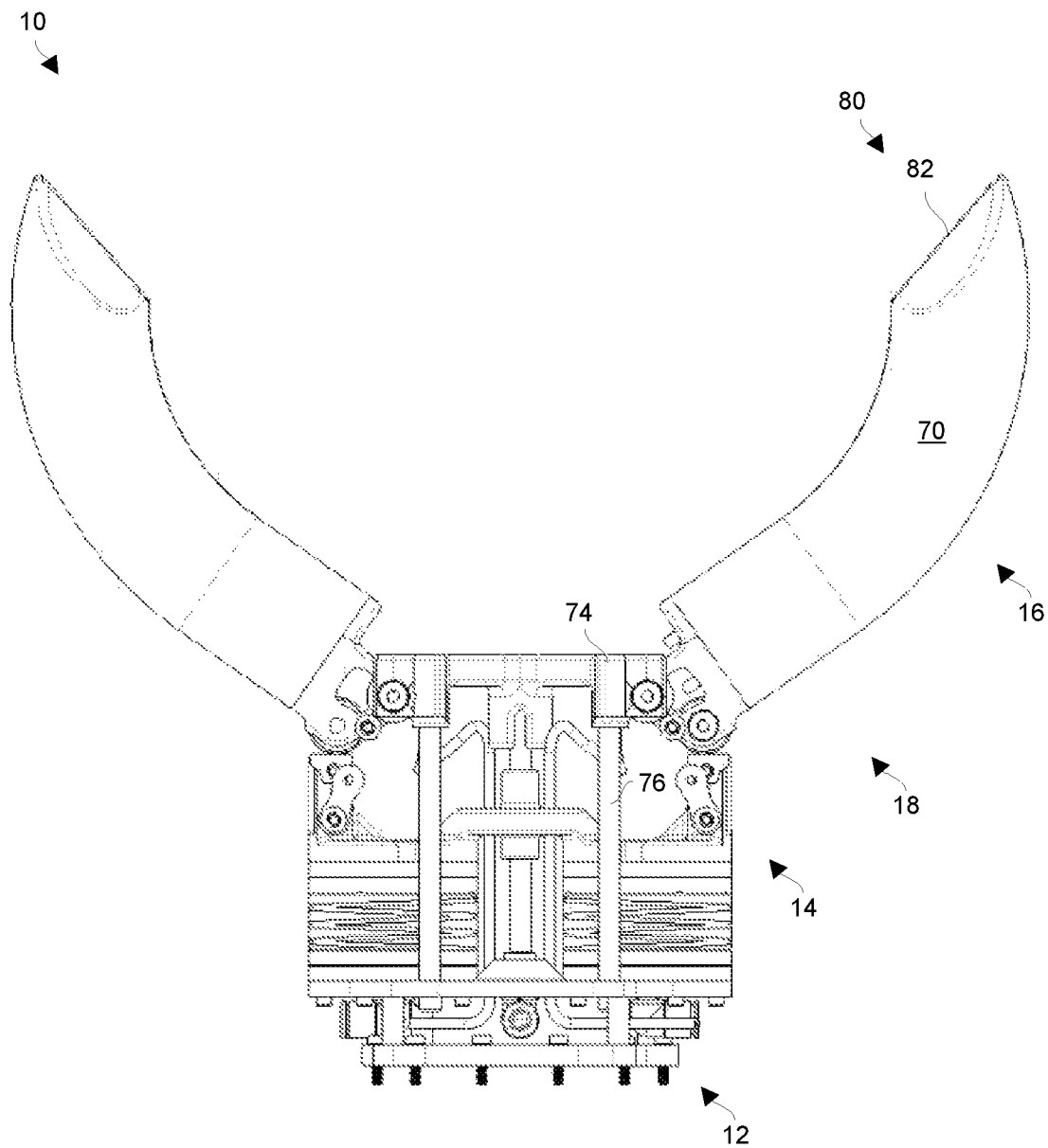
FIG. 7 is a side view of the portion of the example soft end effector apparatus in accordance with certain embodiments.
Figure 8:
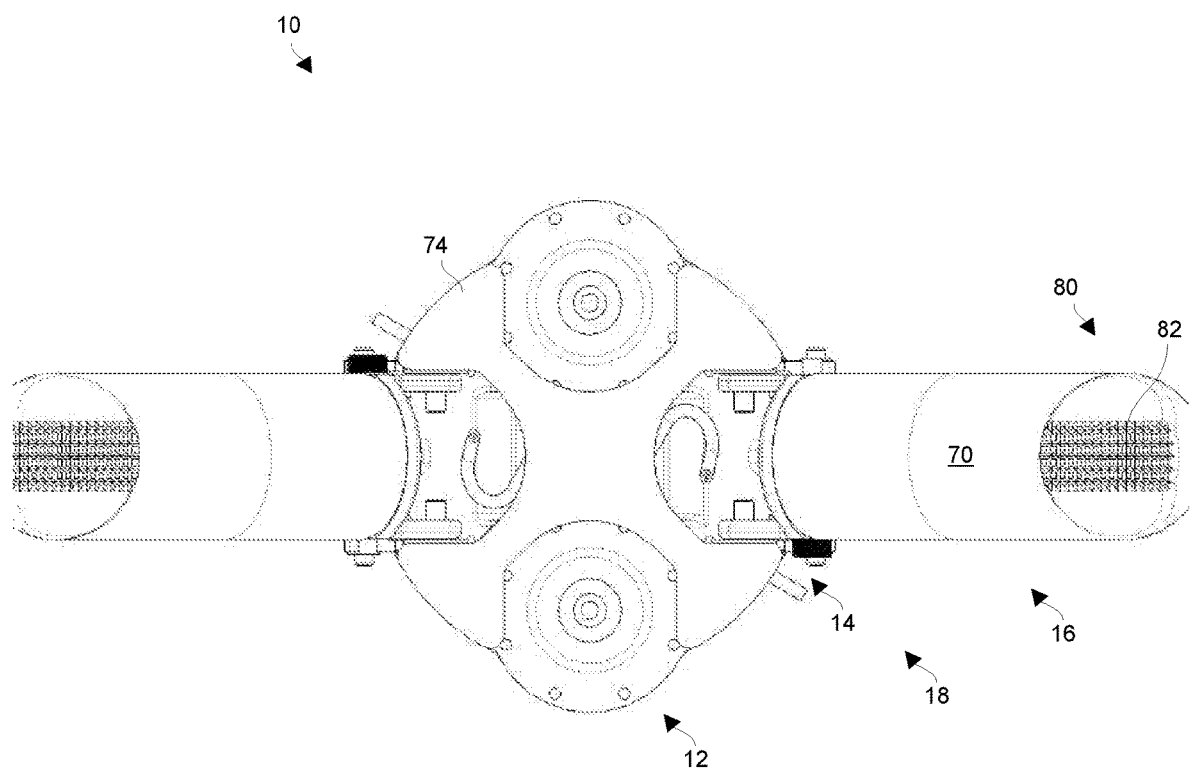
FIG. 8 is a top view of the portion of the example soft end effector apparatus in accordance with certain embodiments.

FIGS. 7 and 8 show certain details of the soft end effector apparatus 10 when there is only a pair of soft appendages 18. FIG. 7 is a side view of the soft end effector apparatus 10. FIG. 8 is a top view of the soft end effector apparatus 10.

It should be understood that, in accordance with certain embodiments, the soft end effector apparatus 10 includes four soft appendages 18 which are arranged into two pairs where the soft appendages 18 oppose or face each other (also see FIGS. 1 and 2). FIGS. 7 and 8 show the soft end effector apparatus 10 when one of the pairs is omitted for simplicity and/or other illustration purposes. However, it should be understood that, in accordance with certain embodiments, the soft end effector apparatus 10 includes a number of soft appendages 18 other than four such as only two which are arranged as a pair to oppose each other as shown in FIGS. 7 and 8.

As shown FIGS. 7 and 8, the wrist assemblies 14 of the soft appendages 18 are currently in compressed states. In accordance with certain embodiments and as will be explained in further detail shortly, the wrist actuator 54 compresses. Accordingly, the finger assemblies 16 of the soft appendages 18 are rotated as far apart as possible thus moving the soft end effector apparatus 10 to an open configuration.

It should be understood that the wrist assemblies 14 of the soft appendages 18 may be actuated into extended states (e.g., due to operation of the fluid controller 36, also see FIG. 4). In such a situation, the finger assemblies 16 of the soft appendages 18 are then rotated as close to each other as possible thus moving the soft end effector apparatus 10 to a closed configuration. In accordance with certain embodiments, the tips 80 of the finger assemblies 16 may even touch.

It should be further appreciated that the wrist assemblies 14 may be partially actuated into partially extended states (e.g., due to operation of the fluid controller 36). In such a situation, the finger assemblies 16 of the soft appendages 18 are then partially rotated thus moving the soft end effector apparatus 10 to a partially closed configuration.

Moreover, since each wrist assembly 14 is independently controllable, the wrist assemblies 14 of the soft end effector apparatus 10 may be in different states of compression/extension. For example, one or more wrist assemblies 14 may be compressed/extended to a first position, one or more other wrist assemblies 14 may be compressed/extended to a second position, and so on. With such independent control, the soft end effector apparatus 10 may be operated to provide various arrangements.

Likewise, the finger assemblies 16 of the soft end effector apparatus 10 may be individually inflated to different degrees at a given time (e.g., due to operation of the fluid controller 36). In particular, each finger assembly 16 may be minimally inflated (e.g., for a very soft grip), partially inflated (e.g., for a slightly stronger grip), and maximally inflated (e.g., for a very strong grip). In accordance with certain embodiments, the tips (or ends) 80 of the inflatable fingers 70 of the finger assemblies 16 are provisioned with textured surfaces 82 to enable rich and reliable contact/gripping/etc. for certain types of maneuvers.

It should be appreciated that, since the finger assemblies 16 are individually controlled, the soft end effector apparatus 10 may be operated to provide various combinations of finger strengths to accommodate various applications (e.g., strong in one direction and soft in another direction, etc.). Further details will now be provided with reference to FIGS. 9 through 11.

Figure 9:
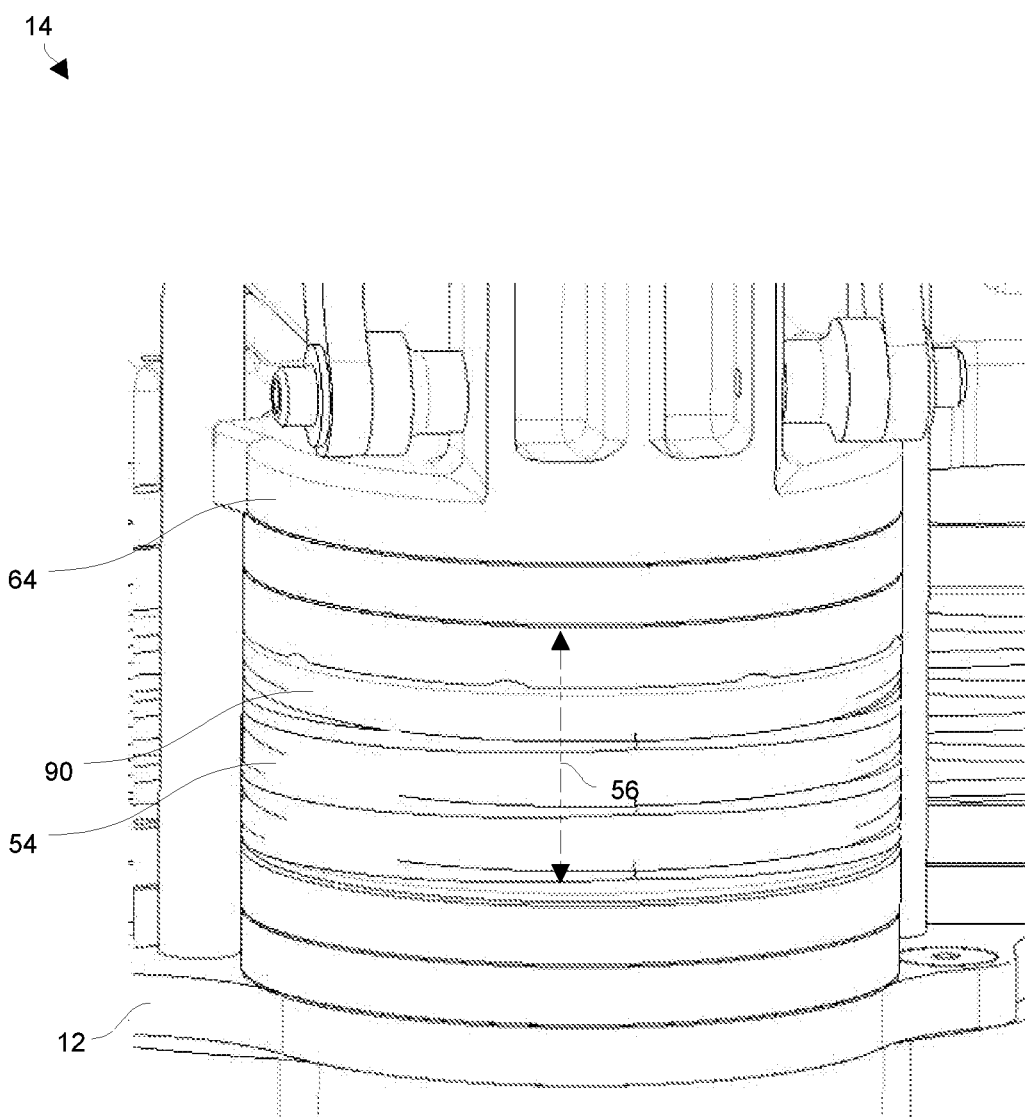
FIG. 9 is a perspective view of a bellows structure of the example soft end effector apparatus in accordance with certain embodiments.
Figure 10:
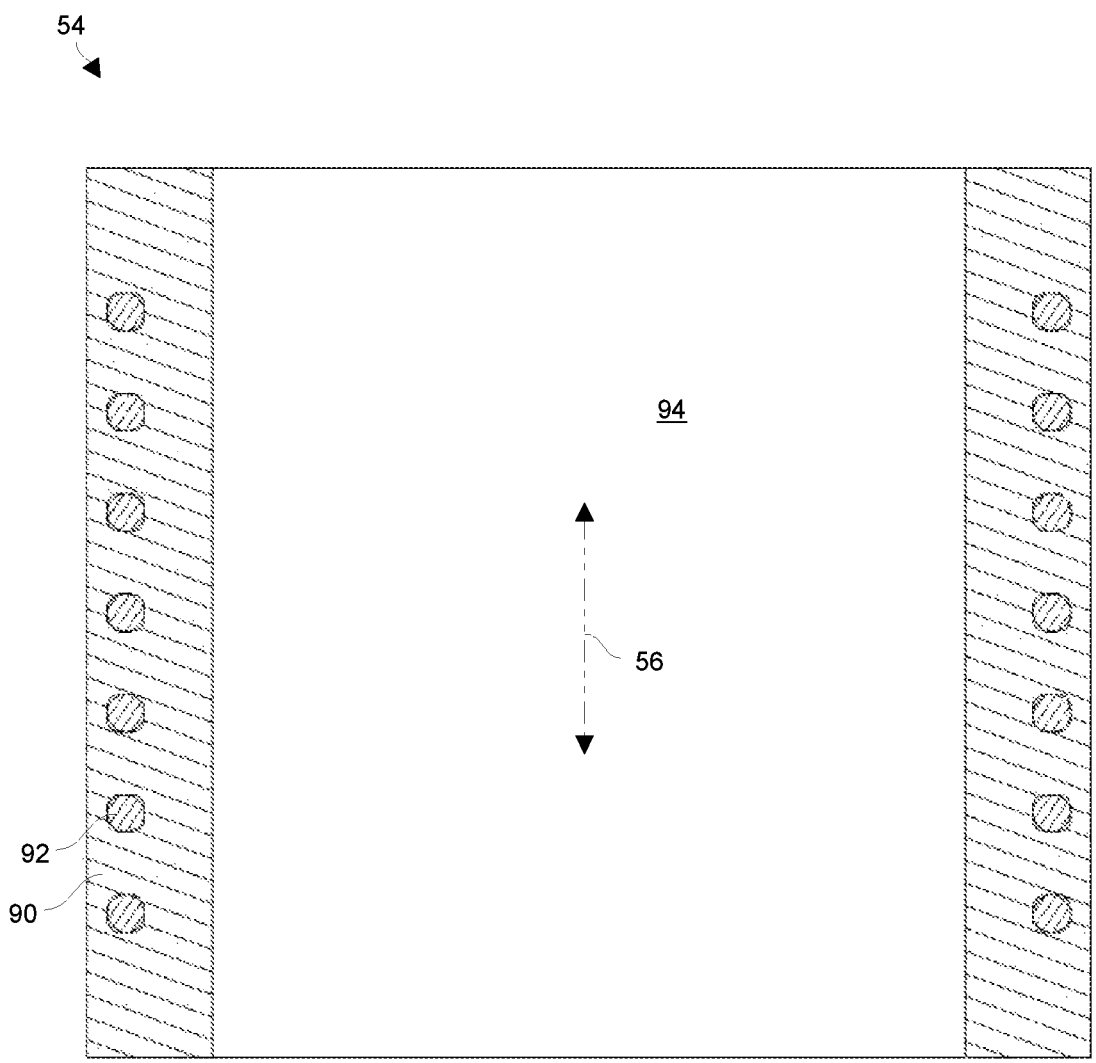
FIG. 10 is a cross-sectional side view of the bellows structure of the example soft end effector apparatus in a compressed state in accordance with certain embodiments.
Figure 11:
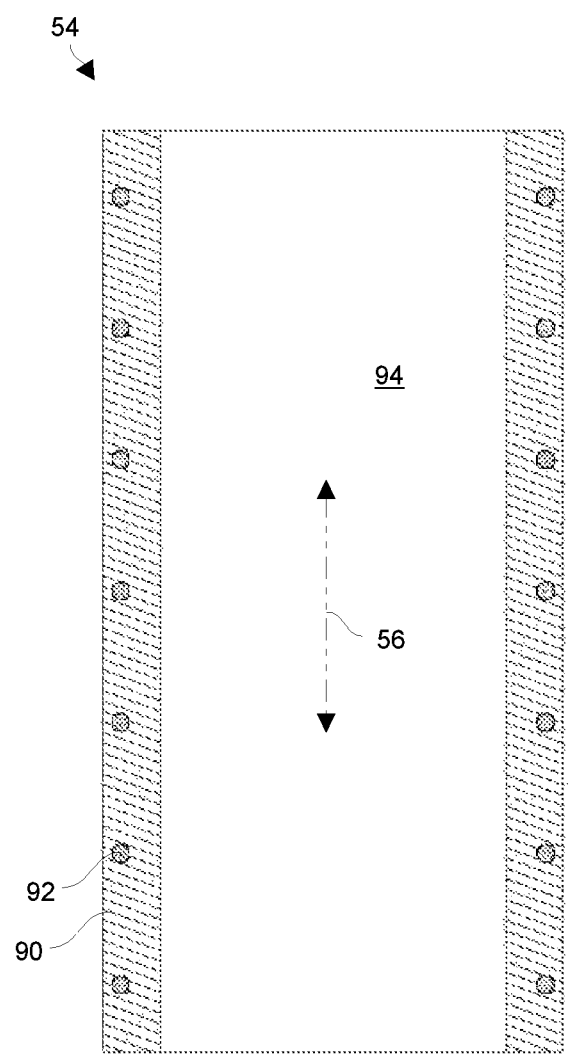
FIG. 11 is a cross-sectional side view of the bellows structure of the example soft end effector apparatus in an expanded state in accordance with certain embodiments.

FIGS. 9 through 11 show certain details regarding a wrist assembly 14. FIG. 9 shows the wrist assembly 14 in a compressed state. FIG. 10 shows certain details of a wrist actuator 54 of the wrist assembly 14 while the wrist assembly 14 is in the compressed state. FIG. 11 shows certain details of the wrist actuator 54 of the wrist assembly 14 while the wrist assembly 14 is in an extended state.

It should be understood that, in accordance with certain embodiments, the wrist actuator 54 of the wrist assembly 14 includes a bellows 90 formed of elastomer material (or similar material that provides for a flexible membrane) and a radially-inextensible member 92. The bellows 90 enables an interior space 94 (or cavity) to hold fluid under pressure provided by the fluid controller 36 (also see FIG. 4). In some arrangements, the elastomer material has sufficient thickness to provide strength and maintain a force biasing the bellows 90 into the compressed state.

The radially-inextensible member 92 provides strength, and forces deformation of the bellows 90 to occur in the axial direction, rather than the radial direction. In some arrangements, the radially-inextensible member 92 includes an inextensible cord wrapped around and/or embedded within the elastomer material to prevent radial expansion of the wrist actuator 54. In some arrangements, the radially-inextensible member 92 includes a radially-inextensible sleeve in place of, or in addition to, the inextensible cord.

With attention to FIGS. 9 and 10, the wrist assembly 14 is currently in the compressed state. In particular, the fluid controller 36 has removed fluid pressure within the bellows 90, and the elastic force pulls the ends of the bellows 90 together along the axis 56 to compress the wrist assembly 14.

With attention to FIG. 11, when the wrist assembly 14 is in the extended state, the bellows 90 is allowed to elongate. Here, the fluid controller 36 has provided fluid pressure within the bellows 90 which overcomes the elastic force provided by the bellows 90 and, in response, the radially-inextensible member 92 expands and the ends of the bellows 90 move away from each other along the axis 56 to expand the wrist assembly 14 (FIG. 9).

It should be appreciated that, during such operation of the wrist assembly 14, the push plate 64 moves toward or away from the base (FIG. 9) thus imparting movement to other portions of the soft end effector apparatus 10. Accordingly, such actuation imparts movement to a finger assembly 16 coupled with the wrist assembly 14.

It should be further appreciated that, once the fluid within the bellows 90 is removed (e.g., pumped out), the wrist assembly 14 returns to the compressed state. In accordance with certain embodiments, the elastic force provided by the elastomer material may even facilitate deflating the bellows 90 thus enabling the bellows 90 to return to the compressed state faster than simply responding to reduced fluid volume from the fluid controller 36 (e.g., also see FIG. 4). Further details will now be provided with reference to FIG. 12.

Figure 12:
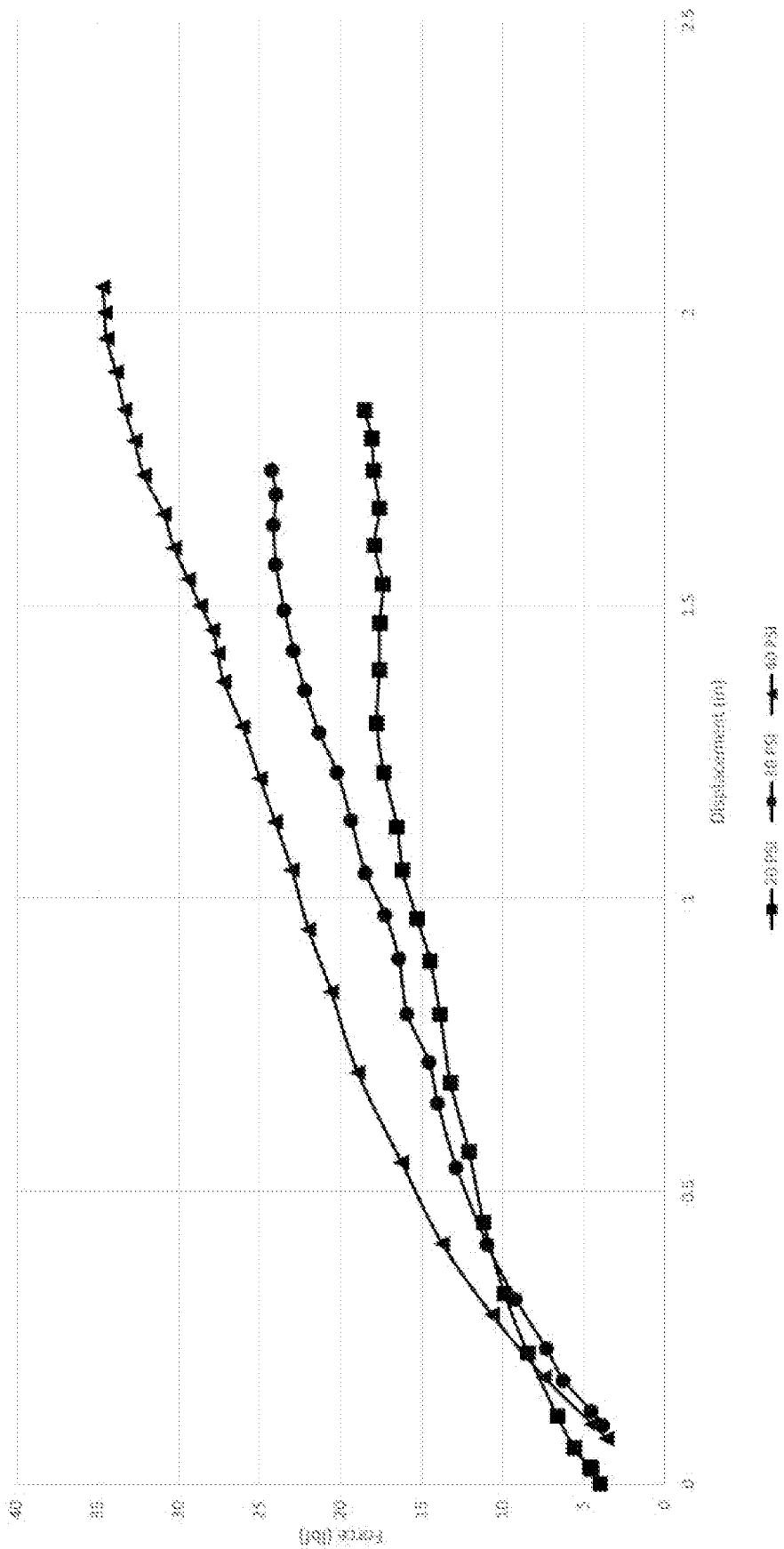
FIG. 12 is a chart of example data pertaining to an example soft end effector apparatus in accordance with certain embodiments.

FIG. 12 shows example data pertaining to an example soft end effector apparatus 10 in accordance with certain embodiments. The X-axis represents displacement in inches. The Y-axis represents force in pounds, i.e., pounds of force.

It should be appreciated that certain experimental data associated with testing or using various embodiments has been collected. Such experimental data includes blocking force data from a finger manufacturer (blocking force is the amount of force a finger can withstand being applied to it without crumpling or crimping), force analysis on the actuators, and more.

As shown in FIG. 12, a snapshot of such test data includes blocking force and displacement characteristics of the finger components of the end effector. As the internal pressure used to inflate the finger is increased, the blocking force per inch of deflection increased. With an internal pressure of 40 psi, 15 lbf of blocking force is achieved with only 0.5 inches of vertical deflection (measured 4 inches away from the finger base). The force output and cycle count for the actuator variants of the end effector was collected as well.

Figure 13:
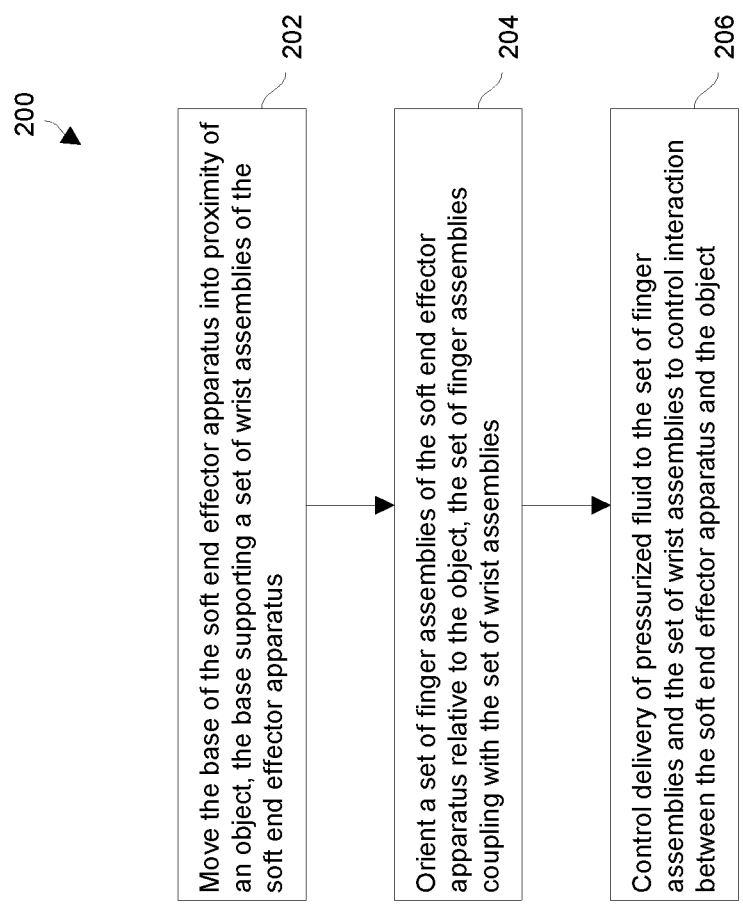
FIG. 13 is a flowchart of a procedure which utilizes a soft end effector apparatus in accordance with certain embodiments.

FIG. 13 is a flowchart of a procedure 200 for utilizing a soft end effector apparatus in accordance with certain embodiments. Such a procedure 200 may be performed by a controller (e.g., a computer, a human operating controls, etc.). Such a procedure 200 may be employed to perform useful work such as moving an object, squeezing an object, lifting an object, placing an object, and so on.

At 202, the controller moves the base of the soft end effector apparatus into proximity of an object. The base supports a set of wrist assemblies of the soft end effector apparatus.

At 204, the controller orients a set of finger assemblies of the soft end effector apparatus relative to the object. The set of finger assemblies couples with the set of wrist assemblies.

At 206, the controller controls delivery of pressurized fluid to the set of finger assemblies and the set of wrist assemblies to control interaction between the soft end effector apparatus and the object.

As described above, improved techniques are directed to utilizing a soft end effector apparatus 10 having multiple sets of actuators 14, 16, e.g., a set of wrist actuators 14 and a set of finger actuators 16. Both sets of actuators 14, 16 may have soft actuator designs which enable improvement in compliance/versatility and reduction in size, weight, magnetic signature, etc. Moreover, the configuration of such actuators 14, 16 may provide an effective combination of strength (e.g., a "rigid air beam" in each finger actuator) and maneuverability/conformity (e.g., enabling the set of finger actuators to interact with different objects or object orientations when applying effective gripping force).

While various embodiments of the present disclosure have been particularly shown and described, it will be understood by those skilled in the art that various changes in form and details may be made therein without departing from the spirit and scope of the present disclosure as defined by the appended claims. Such modifications and enhancements are intended to belong to various embodiments of the disclosure.

One should appreciate that, in accordance with certain embodiments, the soft end effector apparatus, when properly operated, is able to simultaneously provide compliance/conformity as well as strong gripping or grasping strength. Furthermore, the soft actuator assemblies may provide minimal magnetic signatures (if any), are lightweight, and may be packed into small volumes thus making the soft end effector apparatus suitable for a variety of applications such as EOD-related tasks.

It should be understood that control over the soft actuator assemblies may be computerized, may be automated, may be manual, may utilize artificial intelligence (AI), combinations thereof, and so on. In some arrangements, a user enter commands into a computer which then operates the soft end effector apparatus (e.g., via pressure control) perhaps along with other robotics (e.g., the soft end effector apparatus may be mounted to an end of a robotic arm to form a larger robotic system).

It should be further understood that such control may involve valves, sensors (e.g., position sensors/encoders, pressure sensors, temperature sensors, stress sensors, etc.), and other mechanisms to effectuate actuation of the soft actuator assemblies. Such componentry may be integrated or combined with various elements of the soft end effector apparatus (e.g., sensors embedded within the sleeve of each finger, etc.).

In accordance with certain embodiments, the soft end effector apparatus may form at least a portion of a larger robotic assembly. For example, the soft end effector apparatus may be configured to operate as a gripper which is moved into various positions by a robotic arm while performing gripping and releasing operations.

The operation of a pair of soft actuator assemblies (e.g., actuation of a wrist assembly coupled with a finger assembly) of the soft end effector apparatus enables movement of an improved finger-like structure for enhanced versatility. Moreover, the operation of multiple assembly pairs (i.e., multiple improved finger-like structures) enables movement of an improved hand-like structure for versatility and effective gripping strength.

It should be understood that the above-described soft end effector apparatus can be used on other equipment or even other systems that are not primarily gripper devices themselves. Examples of such other systems include inflatable structures, machinery, manufacturing equipment, vehicles, and so on.

In contrast to certain conventional soft robotics that use internal pressure to deform fingers to grab light weight objects, the techniques disclosed herein may utilize a secondary actuator and/or fabric reinforcements. Such features enable an improved end effector (e.g., a gripper) to work at higher pressures and achieve greater grip strengths.

In contrast to certain research papers which focus only on low pressure soft fingers, the techniques disclosed herein are able to deliver significantly more grip force. Such techniques are able to deliver such higher grip force while maintaining a very high level of dexterity.

In contrast to other conventional robotic fingers which use fabrics to reinforce fingers, the techniques disclosed herein employ a secondary actuator to provide greater dexterity. That is, the dexterity and grip strength achieved by the conventional robotic fingers is limited compared to those of the techniques disclosed herein.

Conventional robotic grippers with high grip strength are largely metallic and offer little compliance. In explosive ordnance disposal (EOD) applications, the magnetic signature of a gripper is very problematic. Additionally the expeditionary nature of these tasks requires a very small footprint for size weight and power of systems. Therefore soft robotics is an intriguing solution since it can be compressed and then "inflated" on-site to then operate at its actual size. The rigid nature of metallic (or otherwise non-soft) grippers also limits what objects they can pick up, often it can only pick up the objects it was designed to pick up. This does not limit performance in assembly lines and manufacturing automation, where everything is controlled and known, but is a massive hindrance in EOD (and other) applications that occur in more dynamic and variable environments. Soft gripper developers have been working to dramatically increase the amount of compliance a gripper can provide. Many soft grippers exist that can pick up objects of any diameter as long as they fall into the design specified nominal diameter range and they are not too heavy.

In contrast to the conventional approaches, certain embodiments disclosed herein effectively eliminate the weight restriction of existing soft grippers while maintaining the excellent compliance of soft grippers and operating with grip strengths an order of magnitude greater than competitive methods. In particular, an improved end effector has very few ferrous components so it has a small magnetic signature. Such an improved end effector has proven to also be highly stowable and has a high strength to weight ratio because it is inflatable. Additionally, the system can use either air or water as its medium (i.e. it can be pneumatic or hydraulic). A hydraulic/water filled actuator has many advantages underwater; a few include being neutrally buoyant, not requiring accumulators or other methods to transport media, and is naturally cooled.

In accordance with certain embodiments, an improved end effector is powered entirely by pressurized fluid (e.g., supplied via a controller connected to a fluid source). Accordingly, this soft robotic and effector stows in a volume less than half of its deployed volume and can lift multiple times its weight. When deployed, the end effector fingers become very rigid while maintaining a large amount of compliance allowing for dexterous interactions with objects of complex geometry. A secondary actuator is pressurized to close the end effector with high grip strength.

Some embodiments involve a combination of mechanical implements comprised of soft actuators and soft fingers that provide a solid frame and rotary joints to provide a four finger closing a gripping action. The following block diagram shows schematically how this works including the manifold for integration into either a system to operate this end effector or a robotic arm to which one would attach this end effector. There are several ways to implement this embodiment; the configuration shown is in a four finger embodiment to provide the intersection of high strength and dexterity as well as separable actuation of opposing fingers independently of the other set of opposing fingers. An example implementation is as an end effector, also known as a robotics gripper, but this is not the only configuration that is possible. It should be understood that this embodiment is well suited for use as at least part of a system having water as the pressure medium such as in an underwater application.

Some technical detail features include:
Silicone rubber molded actuators.
Fiber wrapped so pressure creates length expansion rather than radial.
Sealing surface is recessed so smaller area can be used for sealing and full area is used for force
Fabric sleeve reinforced, internal urethane rubber bladder fingers
    Internal pressure creates rigid "beam"
    Sleeve constrains bladder and minimizes stress in bladder
    When gripping, finger conforms around object as load is distributed
Frame
    Maintains finger location
    Finger rotary joints
    Actuator shaft Manifold
Sealing surfaces
Pressure actuated
Tubing internally routed to avoid entanglement
Spring return coupling
Reduces collision impact forces between fingers and environment Alternative implementations of certain designs also include additional fingers, different sized fingers, fingers with a bellows design (this is that a high technical maturity already), a softer wrist design, and more.

It should be understood that any reference to bi-flex actuator refers to the secondary (or wrist) actuator. This secondary (or soft) actuator may cooperatively operate with a respective finger actuator (or simply finger or soft member).

TABLE 1

Actuator Force Measurements
Actuator

| Cycle | Input Pressure (psi) | Force Output (lbf) |
|---|---|---|
| 1 | 40 | 57 |
| 2 | 40 | 57 |
| 3 | 40 | 57.5 |
| 4 | 40 | 57.5 |
| 5 | 40 | 58 |
| 6 | 40 | 58.5 |
| 7 | 40 | 58.5 |
| 8 | 40 | 58 |
| 9 | 40 | 57.5 |
| 10 | 40 | 56.5 |
| 11 | 40 | 58.5 |
| 12 | 40 | 58.5 |
| 13 | 40 | 61.5 |

The results in Table 1 show that the actuators were able to deliver a significant force consistently over numerous cycles. Many tests were also performed on the assembled end effector. The gripper showed that it was able to lift objects in air weighing up to 15 lbf, and of diameters ranging from 0.25 to 5 inches. The same tests were also demonstrated in water. Measurements were also taken of the torque the end effector could provide before the target object spins within its grip. These results are shown in Table 2:

TABLE 2

End Effector Torque Testing with Various Target
Objects End Effector Torque Testing

| Target Object | Peak Torque (lbf-ft) |
|---|---|
| 4.5 Inch Diameter Cylinder | 3.94 |
| 4.5 Inch Diameter Cylinder with Layer of Tape to Increase Friction | 4.59 |
| 3 Inch Side Length Square Extrusion | 4.90 |
| 2.75 Inch Diameter Cylinder with Layer of Tape to Increase Friction | 1.98 |

There are several different possible uses for this embodiment including underwater robotics and manipulation for inspection and maintenance tasking ordnance disposal or recovery efforts. Additionally assembly-line robotics and/or factory automation could also greatly benefit from this design. It is possible that there are medical applications including field casualty recovery and support and even human care (soft actuators present a far lower risk of injuring a person interacting with it). The modular design (each finger has its own actuator that can be attached or detached or even then daisy chained together for more capability) provides options for different orientations and configurations of fingers and/or other implementations. As such there is significant commercial potential of embodiments for underwater robotics (for the oil and gas industries as well as scientific exploration), industrial robotics (factory automation), or biomedical robotics.

Soft robotics is compliant and largely non-rigid and so the manipulation of (relatively) heavy objects is very difficult. This end effector maintains the local compliance of standard soft robotic systems while creating significantly more rigidity in the system. This combination of rigidity and compliance generates dexterity. Pressure-driven linear actuators are combined with pressurized beams to create large force outputs in a small form factor. Limited use of ferrous materials makes the gripper well suited for magnetically-sensitive work. Existing soft robotic grippers do not make use of a secondary actuator to create this end effector's increased grip force. Existing soft grippers rely on the finger themselves to create grip force. Certain embodiments involve application of air beam style soft fingers, the concept of multiple actuators constrained radially, the application of soft actuators with soft fingers, and suitability for operation underwater including water as the pressurized medium.

It should be appreciated that there may be two main competitors: traditional and rigid and effectors and secondly other soft robotics actuators.

When compared to traditional and rigid actuators, certain embodiments disclosed herein are significantly lighter, can be compressed to one half of its volume for shipping, storage, or transportation, does not risk sensitive objects or operators who interact with it, is appropriate for magnetic work, and does not have corrosion and/or other risks underwater associated with metallic components.

When compared to other soft robotics actuators, certain embodiments disclosed herein are lighter in weight and soft but also provide significantly more grip force, a high force to weight ratio and a level of dexterity that is not available in other soft robotic systems. Soft robotic grippers do not usually work with a range of small to large objects while maintaining dexterity. Additionally in our case compliance is created through pressure and material use.

Certain embodiments are directed to a collection of soft robotics components working together. It is possible to replace the soft robotics actuators disclosed herein with conventional normal electromagnetic or other actuators but this comes at significant cost removing the soft component as well as increasing the weight and complexity of the control of the gripper. It is possible for the fingers to be a molded elastomeric version that is intrinsically flexible and not based on fabrics the way that this finger is; such fingers have been developed and utilized to understand potential alternatives and enhancements. Such a finger design can be used and/or included if greater amounts of force and blocking force are not required or critical such as for certain explosive ordnance disposal applications.

Other suitable applications include general actuation (wing flaps/structure forming and control, locomotion), walking robotics, payload release or capture underwater, vibration resistance and supporting fixtures, and more.

In accordance with certain embodiments, the silicone rubber molded actuators are the wrist actuators. In some arrangements, the fingers are implemented as a smooth, curved finger. In other arrangements, the profile of the fabric sleeve that reinforces the finger is changed. Along these lines, the sleeve may be shaped like a bellows or accordion so that, when pressure is added to the internal bladder of the finger, the bladder expands and pushes against the sleeve and the accordion ridges extend. By changing the bellows/accordion pattern of the sleeve, one may control how the finger profile changes during actuation. This helps the fingers conform to more objects as well as generate additional gripping force.

In accordance with certain embodiments, the wrist actuators are the silicone rubber actuators. Such wrist actuators may use a bellows design. The fingers have an internal bladder that is reinforced with a fabric sleeve. In their current form, the fingers are smooth and curved. The reinforcing fabric of the finger can be changed to include bellows features so the finger curves as it is inflated.

It should be understood that the terms "wrist" and "finger" are used within this document to improve readability and to simply distinguish two assemblies from each other, and that other terminology is suitable for use (such as first and second). Such terms are not intended to impose any requirements/restrictions pertaining to those of a human hand.

While various embodiments of the present disclosure have been particularly shown and described, it will be understood by those skilled in the art that various changes in form and details may be made therein without departing from the spirit and scope of the present disclosure as defined by the appended claims.

For example, if radial expansion is not a concern, the secondary actuators could be replaced by airbags that expand in all directions. Traditional metallic pistons could also be used, but such may not maintain the soft quality of our secondary actuators. Such modifications and enhancements are intended to belong to various embodiments of the disclosure. Such modifications and enhancements are intended to belong to various embodiments of the disclosure.

What is claimed is:

1. Soft end effector apparatus, comprising:
   a base;
   a set of wrist assemblies coupled with the base; and
   a set of finger assemblies coupled with the set of wrist assemblies;
   each wrist assembly of the set of wrist assemblies (i) having (A) a respective soft actuator constrained to operate along a straight line and (B) a respective coupling that rotatably couples the respective soft actuator with a respective finger assembly of the set of finger assemblies and (ii) providing movement to that respective finger assembly relative to the base during actuation of the respective soft actuator of that wrist assembly and during independent actuation of that respective finger assembly.

2. Soft end effector apparatus as in claim 1 wherein each wrist assembly of the set of wrist assemblies includes a compliant member disposed between the base and the respective finger assembly coupled to that wrist assembly, the compliant member being configured to selectively inflate and deflate to impart movement to the respective finger assembly.

3. Soft end effector apparatus as in claim 2 wherein the compliant member of each wrist assembly is in a shape of a bellows which is configured to expand to apply a force on the respective finger assembly coupled to that wrist assembly, the respective finger assembly being pivotably mounted to the base to translate the applied force into pivoting movement relative to the base.

4. Soft end effector apparatus as in claim 1 wherein each finger assembly of the set of finger assemblies includes a fabric sleeve and a bladder disposed within the fabric sleeve, the bladder being configured to selectively inflate and deflate to control movement of the fabric sleeve.

5. Soft end effector apparatus as in claim 4 wherein the fabric sleeve of each finger assembly defines a smooth curved finger to provide compliance and strength while applying gripping force to an external object.

6. Soft end effector apparatus as in claim 4 wherein the fabric sleeve of each finger assembly defines an accordion surfaced finger to provide finger profile changes during actuation of that finger assembly.

7. Soft end effector apparatus as in claim 1 wherein the set of wrist assemblies includes exactly four wrist assemblies, each wrist assembly of the exactly four wrist assemblies coupling with a same side of the base and being constructed and arranged to extend in a direction away from the same side of the base during the actuation of the respective soft actuator of that wrist assembly.

8. Soft end effector apparatus as in claim 1 wherein the set of finger assemblies includes exactly four finger assemblies, the exactly four finger assemblies including (i) a first pair of finger assemblies constructed and arranged to move toward and away from each other along a first axis, and (ii) a second pair of finger assemblies constructed and arranged to move toward and away from each other along a second axis that is perpendicular to the first axis.

9. Soft end effector apparatus as in claim 1 wherein the base is constructed and arranged to mount to a robotic arm assembly to form a robotic manipulator.

10. Soft end effector apparatus as in claim 1, further comprising:
    a fluid controller constructed and arranged to individually provide pressurized fluid to each wrist assembly of the set of wrist assemblies and each finger assembly of the set of finger assemblies to control interaction between the soft end effector apparatus and an external object.

11. Soft end effector apparatus as in claim 1 wherein each wrist assembly of the set of wrist assemblies includes a compliant member that is configured to deform from an initial geometry by pressurized input fluid during the actuation of the respective soft actuator of that wrist assembly and restore to the initial geometry by elastic forces when the input pressure is removed.

12. Soft end effector apparatus as in claim 1 wherein the soft actuator of each wrist assembly of the set of wrist assemblies includes a respective first end coupled with the base and a respective second end opposite the first end, both the respective first end and the respective second end being rotationally fixed relative to the base.

13. Soft end effector apparatus as in claim 1 wherein the coupling of each wrist assembly of the set of wrist assemblies is configured to angularly deflect the respective finger assembly relative to the respective soft actuator based on the actuation of the respective soft actuator.

14. Soft end effector apparatus as in claim 1 wherein the coupling of each wrist assembly of the set of wrist assemblies includes a respective pivot mount and a respective rocker body rotatably coupled with the respective pivot mount, the respective pivot mount being disposed a fixed distance from the base, the respective rocker body configured to rotate based on the actuation of the respective soft actuator.

15. Soft end effector apparatus as in claim 1 wherein the set of wrist assemblies includes multiple wrist assemblies individually coupled one-to-one with respective finger assemblies of the set of finger assemblies.

16. Soft end effector apparatus as in claim 15 further comprising a fluid controller and respective fluid feeds connected with the multiple wrist assemblies, the fluid controller being configured to control delivery of pressurized fluid to the multiple wrist assemblies through the respective fluid feeds to angularly deflect the respective finger assemblies independently of each other.

17. A robotic system, comprising:
a fluid controller;
an arm portion; and
a soft end effector apparatus coupled with the fluid controller and the arm portion, the soft end effector apparatus including:
a base constructed and arranged to mount to the arm portion,
a set of wrist assemblies coupled with the base, and
a set of finger assemblies coupled with the set of wrist assemblies;
each wrist assembly of the set of wrist assemblies (i) having (A) a respective soft actuator constrained to operate along a straight line and (B) a respective coupling that rotatably couples the respective soft actuator with a respective finger assembly of the set of finger assemblies and (ii) providing movement to that respective finger assembly relative to the base during actuation of the respective soft actuator of that wrist assembly and during independent actuation of that respective finger assembly in response to control from the fluid controller.

18. A method of operating a soft end effector apparatus, the method comprising:
moving a base of the soft end effector apparatus into proximity of an object, the base supporting a set of wrist assemblies of the soft end effector apparatus, each wrist assembly of the set of wrist assemblies having (A) a respective soft actuator constrained to operate along a straight line and (B) a respective coupling that rotatably couples the respective soft actuator with a respective finger assembly of a set of finger assemblies of the soft end effector apparatus;

orienting the set of finger assemblies of the soft end effector apparatus relative to the object, the set of finger assemblies coupling with the set of wrist assemblies; and controlling delivery of pressurized fluid to the set of finger assemblies and the set of wrist assemblies to control interaction between the soft end effector apparatus and the object.

19. A method of combining of a set of soft members and a set of soft actuators to create compliant loading and contact while maintaining at least one of significant applied force and significant applied torque, the method comprising:
fixing the set of soft members to a set of predefined degrees of freedom;

producing rotational and translational compliance to all interfaces with the set of soft members; and applying at least one of force and torque to the set of soft members through the set of soft actuators which is coupled to the set of soft members, each soft actuator of the set of soft actuators being constrained to operate along a straight line and being rotatably coupled with a respective soft member of the set of soft members via a respective coupling.

* * * * *